United States Patent [19]

Picozza

[11] Patent Number: 4,505,506
[45] Date of Patent: Mar. 19, 1985

[54] ADJUSTABLE CARRIER FOR CONTAINERS

[75] Inventor: Augusto A. Picozza, Johnston, R.I.

[73] Assignee: Dart Industries Inc., Northbrook, Ill.

[21] Appl. No.: 493,477

[22] Filed: May 11, 1983

[51] Int. Cl.$^3$ ............................................. B65D 61/00
[52] U.S. Cl. ................................... 294/161; 206/503
[58] Field of Search ........................ 294/161, 168, 170; 206/503, 203, 820; 211/128, 129; 220/4 A, 4 D, 72; D8/394

[56] References Cited

U.S. PATENT DOCUMENTS

| | | | |
|---|---|---|---|
| D. 201,798 | 8/1965 | Miller | D8/394 |
| D. 204,545 | 4/1966 | Geisinger | D8/394 |
| D. 208,729 | 9/1967 | Geisinger | D8/394 |
| D. 224,960 | 10/1972 | Wilson | D8/394 |
| D. 294,217 | 2/1984 | Foos | 294/170 |
| 1,065,633 | 6/1913 | Stone | 294/161 |
| 1,338,066 | 4/1920 | Blocker | 294/168 |
| 1,451,146 | 4/1923 | Fate | 206/503 |
| 1,490,973 | 4/1924 | Hodgson | 206/503 |
| 1,499,077 | 6/1924 | Puciato | 294/170 |
| 1,852,195 | 4/1932 | Shaw | 294/168 |
| 2,087,375 | 7/1937 | Ehrhardt | 294/161 |

FOREIGN PATENT DOCUMENTS 517774 12/1920 France ........................ 294/161

Primary Examiner—James B. Marbert
Attorney, Agent, or Firm—A. Lewis Worthem, Jr.

[57] ABSTRACT

An adjustable carrier for multiple stacked containers, the carrier including a lower collar positionable peripherally about and lockably engagable with the lowermost container, an upper collar engagable about the uppermost container in cover retaining relationship therewith, and multiple straps engaged between the collars. Each strap is snap-locked to the lower collar and projects vertically into an adjustable ratchet and pawl engagement with the upper collar. The upper collar incorporates an integral handle which receives any excess length of the straps therein.

15 Claims, 8 Drawing Figures

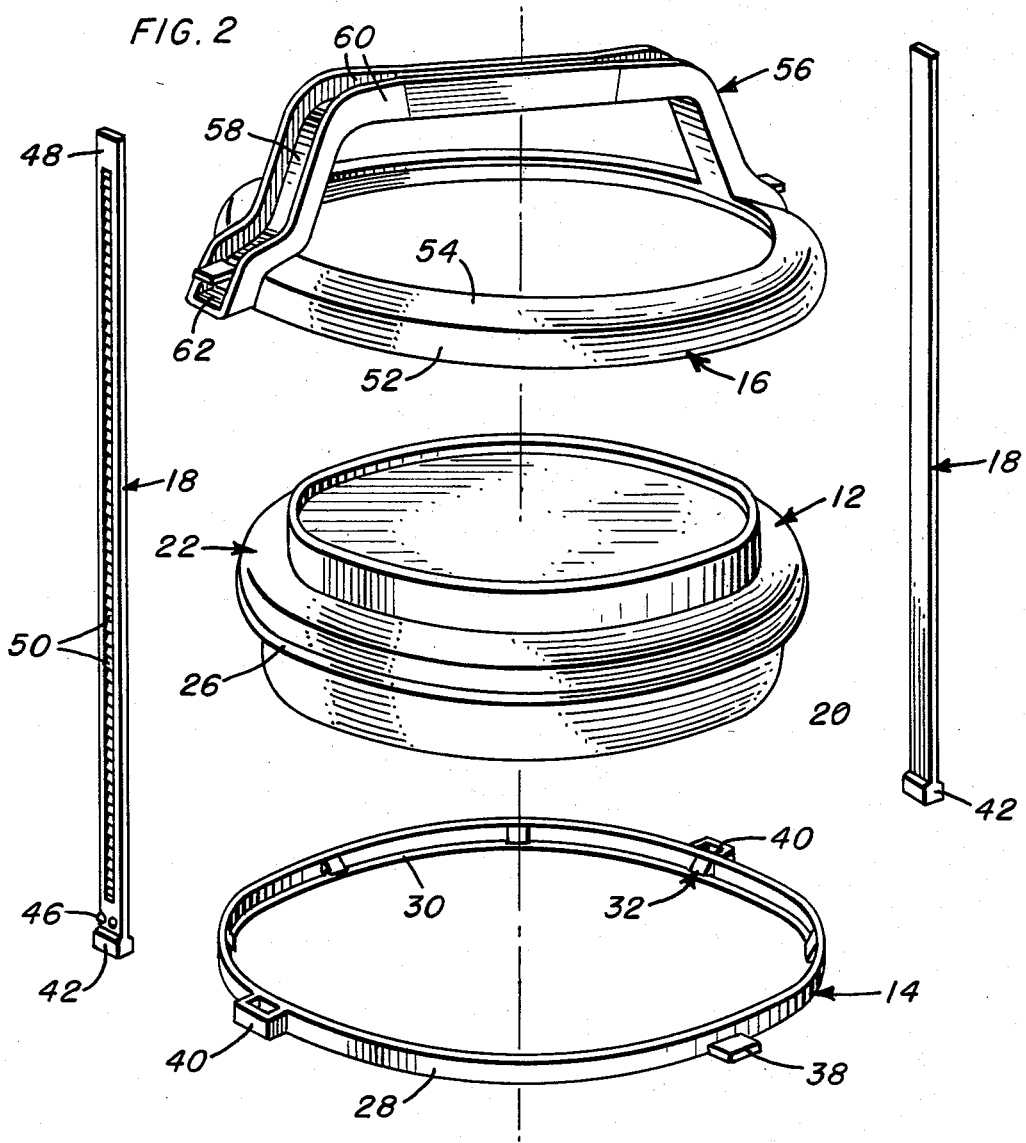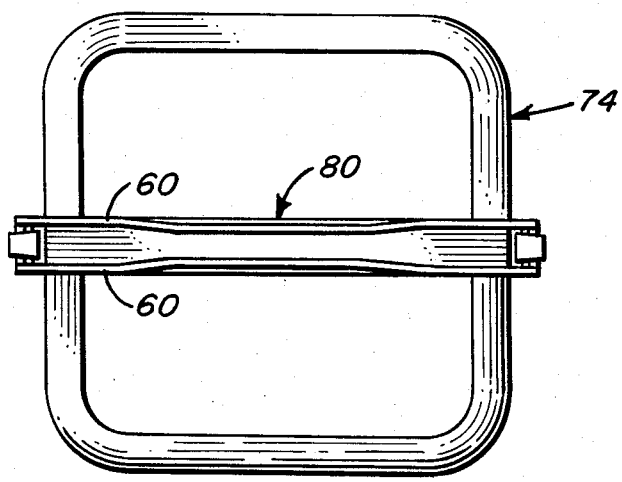

ADJUSTABLE CARRIER FOR CONTAINERS

BACKGROUND OF THE INVENTION

Carriers for multiple stacked containers, to accommodate either a fixed number of containrs or a variable number of containers, are well known as evidenced by the following patents:

A. A. Foos, U.S. Pat. No. 294,217, Feb. 26, 1884
C. H. Stone, U.S. Pat. No. 1,065,633, June 24, 1913
H. E. Hodgson, U.S. Pat. No. 1,490,973, Apr. 22, 1924
J. Puciato, U.S. Pat. No. 1,499,077 June 24, 1924.

The carriers illustrated in these patents are adapted, in each instance, to cooperate with specific containers, or containers specifically modified to accommodate the carrier. It will also be noted that the containers in these patents function as an assembly wherein only the upper container is provided with a cover, the respective containers therebelow each covering the subjacent container.

A further form of carrier will be noted in Shaw, U.S. Pat. No. 1,852,195, issued Apr. 5, 1932. In this patent adjustment of an overlying top member relative to an underlying base member is effected along rigid ratchet bars through a tooth and pawl system.

The prior art also contains many teachings of flexible bundling straps incorporating multiple ratchet teeth along the body thereof which selectively interlock with a pawl integral with one end of the body, note Geisinger, U.S. Pat. No. Des. 204,545, issued Apr. 26, 1966.

SUMMARY OF THE INVENTION

The invention herein is directed to a carrier which is particularly adapted for the accommodation of multiple stacked closed containers. The carrier is formed of four molded plastic components including lower and upper collars adapted to engage about the lower and upper containers, and a pair of opposed ratchet straps extending between the lower and upper collars and selectively locked thereto.

The lower or base collar engages upwardly about the body of a lowermost container, while the upper or top collar engages downwardly about the top or cover portion of an uppermost container. The carrier is particularly adapted for use in conjunction with containers incorporating an integral peripheral outwardly directed handling flange toward the upper end thereof and immediately below the container cover. As such, the lower collar incorporates an inwardly directed peripheral lip upon which the container flange sits. Coupled with this lip is a plurality of peripherally spaced inwardly directed lugs on the lower collar immediately above the lip. Each of these lugs includes a downwardly and inwardly tapered face terminating in an undercut or recess adapted to receive and retain the container flange on the lip.

The lower collar additionally includes a pair of diametrically opposed outwardly projecting apertured ears. The ratchet straps are upwardly engaged through these ears, with the lower end of each strap, through an enlargement thereon, engaging beneath the corresponding ear.

The upper portion of each strap is introduced through a corresponding aperture or passage on the upper collar, the length of each strap engaged through the respective upper apertures being dependent upon the number of stacked containers to be accommodated. An integral pawl, associated with each upper collar aperture, engages the associated strap in a manner requiring positive manual manipulation for release. Any number of containers, within the working length of the straps, may be received within the carrier.

The handle, molded integrally with the upper collar, diametrically spans the collar and defines a central hand grip portion. The handle is of an upwardly directed channel configuration and has the opposed ends thereof aligned with the strap latching means through which the upper portions of the straps are received. The individual straps, in turn, are flexible, enabling an inward arcing into the channel configured handle of any portion of the strap projecting vertically beyond the associated latch mechanism.

Other aspects and features of the invention will become apparent in the details of construction and manner of use of the carrier as more fully hereinafter described and claimed.

BRIEF DESCRIPTION OF THE DRAWINGS

FIG. 2 is an exploded perspective view of the carrier and a typical container;

FIG. 8 is a top plan view of a further embodiment of the carrier particularly adapted for the accommodation of rectangular containers.

DESCRIPTION OF THE PREFERRED EMBODIMENT

Figure 1:
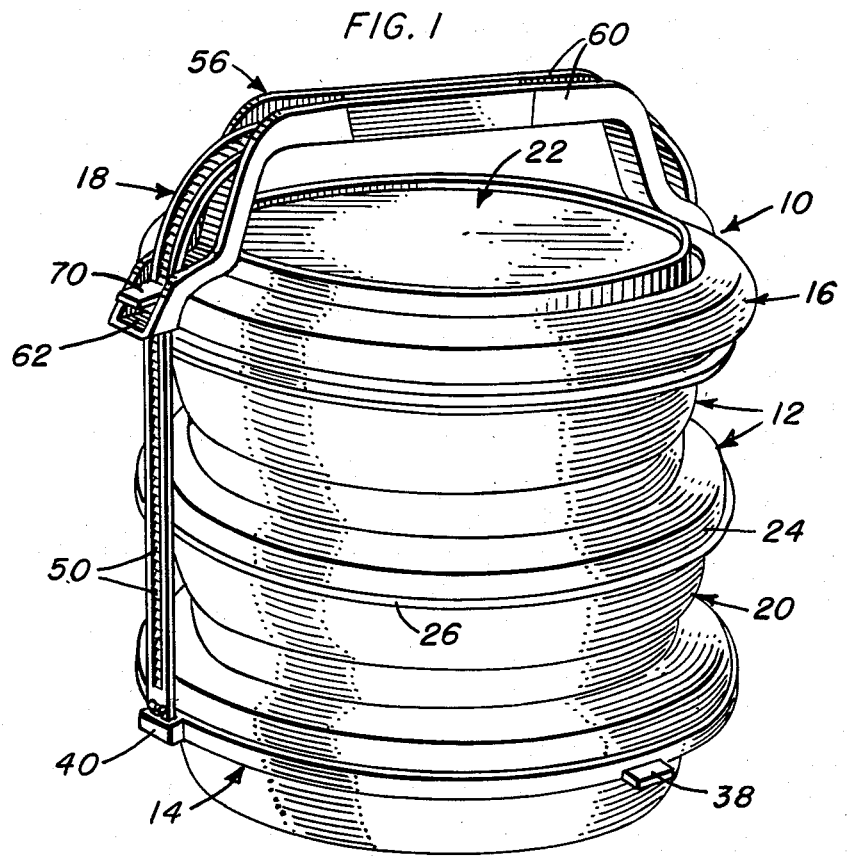
FIG. 1 is a perspective view of the carrier of the instant invention mounting three circular containers.
Figure 6:
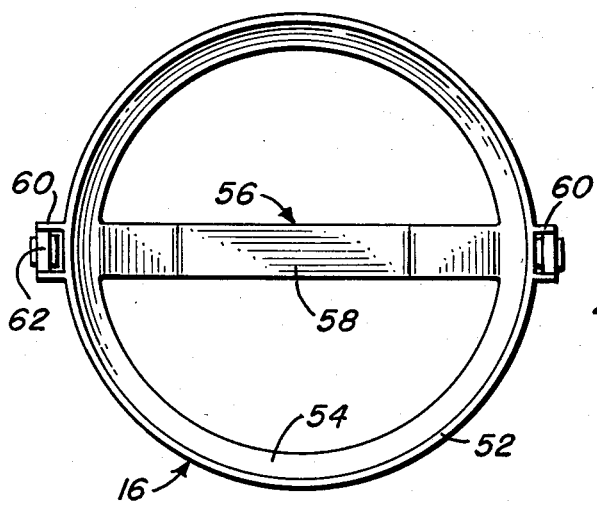
FIG. 6 is bottom plan view of the upper collar and handle unit.
Figure 7:
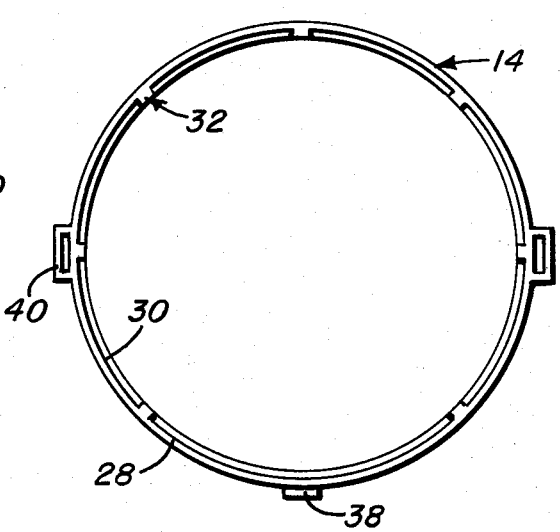
FIG. 7 is a top plan view of the lower collar.

Referring now more specifically to the drawings, the carrier 10, illustrated in FIG. 1 in locked engagement with the containers 12, is formed of four components or units, a lower or base collar 14, an upper collar 16, and two ratchet straps 18. This carrier 10 is particularly adapted to receive, and provide a carrying means for, one or more containers 12 of a circular configuration which include a container body 20, an overlying lid or cover 22 with a depending peripheral edge portion 24, and a peripheral outwardly directed handling flange 26 integrally formed with the container body 20 and positioned in slightly spaced relation immediately below the cover 22. The bottom of the containr body 20, as well as the top of the container cover 22 are so configured as to allow for a convenient stacking thereof. The number of containers 12 which can be accommodated in the carrier 10 is governed by the length of the ratchet straps 18.

The lower or base collar 14 includes an annular vertical wall 28 with an integral inwardly directed lip 30 peripherally about the lower edge thereof. The wall 28 and lip 30 are of a size and configuration to engage upwardly about the body 20 of the lowermost container 12 and position the lip 30 in underlying supporting relationship to the container flange 26.

Figure 5:
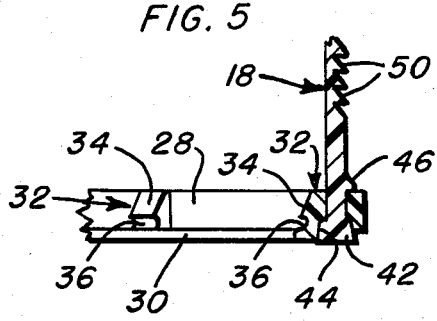
FIG. 5 is cross-sectional detail through the lower collar and a strap end engaged therewith.

It is desired that the lower collar 14 be releasably locked to the container flange 26 to assist in the mounting of the carrier 10, as well as in the stabilization of the mounted containers. Accordingly, a plurality of locking lugs 32 are integrally formed with the collar wall 28 and lip 30 at peripherally spaced points about the lower collar 14. Each lug 32 projects inwardly from the inner face of the wall 28 and includes an inwardly and downwardly tapered inner face 34 terminating above the lip 30 in an undercut portion or recess 36 into which the container flange 26 can be snaplocked. As will be best noted in FIG. 5, the recess 36 is defined immediately above the lip 30 whereby the flange 26, when snapped into position, is retained in seated engagement directly on the lip 30.

The inherent resiliency of the lower collar 14, as well as possibly that of container flange 26, enables the desired snap-locking of the collar in position about the container. In order to facilitate the manual disengagement of the lower collar 14 from a received container 12, a single laterally outward directed pressure tab 38 is integrally formed with the collar wall 28. With this tab, one need merely exert downward pressure thereon for a downward shifting of the adjoining portion of the lower collar 14 relative to the received container 12. Such pressure will cause a degree of flexure within the lower collar and a release of the container flange from the lug recesses 36.

The lower collar 14 is completed by a pair of opposed apertured ears 40 integrally formed with the collar wall 28 and projecting laterally or radially outward therefrom on a diametric line preferably 90° from the tab 38. These ears 40 receive the ratchet straps 18 vertically therethrough. Each ratchet strap 18, noting FIG. 2 and detailed FIG. 5, includes an enlarged head or block 42 on the lower end thereof which engages within an enlarged downwardly opening socket constituting the lower end of the corresponding ear aperture. If desired, the strap head 42 can have slightly tapered upper surfaces for facilitating entry into the socket 44 and providing for a positive wedging of the head 42 therein. The portion of each aperture above the socket 44 is of a size to closely receive the strap 18 therethrough while precluding passage of the enlarged head 42. A releasable locking of each strap 18 within the corresponding aperture is further effected by the provision of two small integrally formed projections or lugs 46 upwardly spaced from the enlarged head 42 a distance so as to engage with the upper surface of the corresponding mounting ear 40 upon an intimate seating of the head 42 within the socket 44. The inherent flexible nature of the materials utilized allow for the degree of flexure needed to engage the lugs 46.

The straps 18, upward from the headed lower end thereof and terminating short of the upper leading end portion 48, are provided with an outwardly directed rack-like configuration consisting of a plurality of downwardly and outwardly directed ratchet teeth 50 for adjustable locked engagement with the upper collar 16 as shall be described presently.

The upper collar 16, of the same annular size as the lower collar 14, is specifically adapted to engage over the cover of the upper container for a positive retention thereof and the application of a container securing compressive force. This upper collar 16 includes an annular generally vertical outer wall 52 and a top wall 54 integrally formed therewith and projecting inwardly therefrom peripherally thereabout. As noted particularly in FIGS. 3 and 4, the walls 52 and 54 of the collar 16 may incline slightly to more readily conform to the container cover 22 along both the depending peripheral skirt 24 thereof and a generally horizontal portion of the cover immediately thereabove.

The upper collar 16 also includes a carrying handle 56 integrally formed therewith. The handle 56 extends diametrically across the upper collar 16 with the opposed end portions thereof overlying and conforming to the top and side walls 52 and 54. The handle 56 is of an outwardly directed channel configuration, defined by an inner panel 58 constituting a continuation of the top wall 54, and a pair of vertical panels or side flanges 60 projecting in parallel spaced relation from the opposite edges of the panel 58. As will be appreciated from the drawings, the handle 56, at the opposed end portions thereof, rises quite abruptly from the upper collar 16 to a central elongated section which allows for an accommodation of the cover of the uppermost container 12 and provides a freely accessible hand grip.

Figure 3:
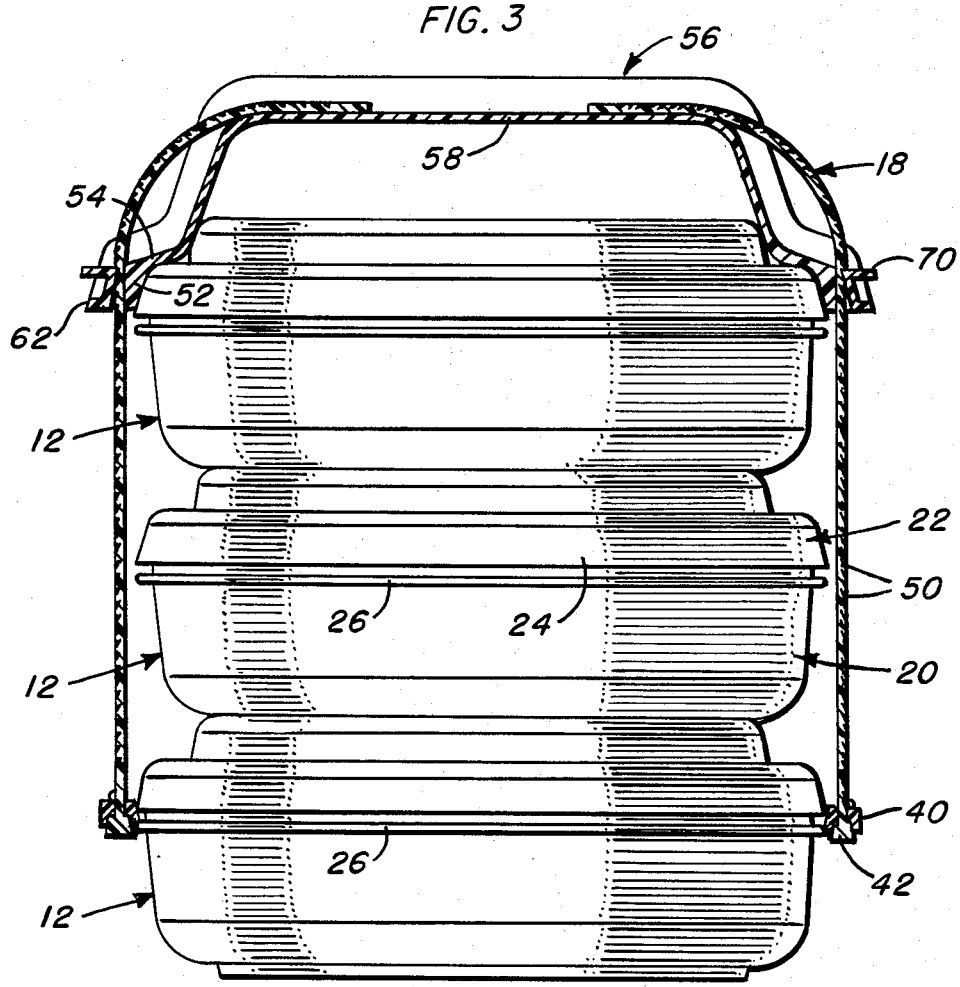
FIG. 3 is a cross-sectional view of the carrier with received containers illustrated in elevation.
Figure 4:
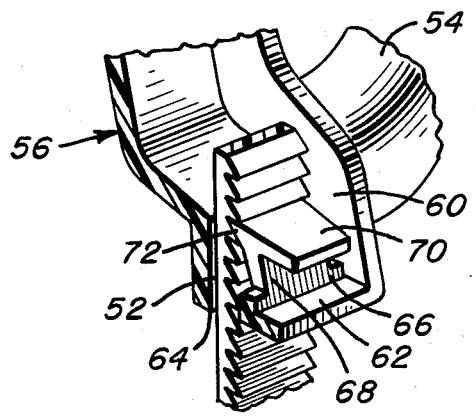
FIG. 4 is a perspective detail of the strap latching means.

Noting FIGS. 2, 3, and in particular the detailed showing in FIG. 4, the opposed ends of the vertical panels 60, at each end of the handle 56, are interconnected by a laterally directed bottom panel or end piece 62. This end piece has an inner edge spaced outwardly from the adjacent wall 52 to define a vertical passage or slot 64 through which the upper portion of a strap 18 is introduced. Rising vertically from the inner edge of the cross piece 62 is a vertical panel 66 having a lower portion coextensive with the end panel 62 and similarly integrally formed with the opposed side flanges 60 of the handle 56. The upper portion of the panel 66 is of a reduced width, as at 68, with this portion 68 integrally mounting an overlying horizontally directed finger actuatable latch tab 70. This panel-like latch tab 70 is of equal width with the panel portion 68 immediately therebelow and includes, projecting inwardly of the panel 66, an integrally formed pawl defining portion 72. The outer portion of the latch tab 70 projects in overlying spaced relation to the corresponding end panel 62. In this manner, the latch mechanism can be conveniently manipulated, for the slective retraction of the pawl 72, by downwardly manual pressure on the tab 70. The inherent resiliency of the material will, upon a release of manual pressure, automatically return the pawl 72 into cooperative latching or locking engagement with the ratchet strap 18, more particularly with a ratchet tooth 50 thereof.

As will be appreciated, the ratchet straps 18 are positioned to have the ratchet teeth 50 thereon outwardly directed and thus readily engagable with the inwardly directed pawls 72 of the two latch mechanisms, one to either end of the handle construction 56. In those instances wherein the full operative length of the ratchet straps 18 is not required, the upper portions of the straps 18, as will be best noted in FIGS. 1 and 3, may be arced or deflected into the channel-shaped handle 56. The upper portions of the straps 18 will thus be contained within the handle by the snugly fitting flanges 60. As best seen in FIG. 8, containment of the straps is effected also by a central handle portion 80 in which the flanges 60 are slightly inwardly leaning.

From the foregoing, it is to be appreciated that a unique adjustable carrier has been defined. This carrier utilizes four components, each formed of an appropriate synthetic resinous material, which interlock about a stack of containers in a manner so as to confine the containers for the handling or carrying thereof as a single unit. The carrier, particularly in light of the container gripping features of the lower collar thereof, is specifically adapted for the accommodation of containers incorporating a peripheral handling rim or flange at an intermediate point along the height of the container.

While the carrier, in the detailed principal embodiment thereof, utilizes annular collars and particularly adapts to annular containers, it is to be appreciated, noting FIG. 8 in particular, the collars can assume other configurations, for example rectangular, in those instances wherein containers of such other configurations are involved. Such containers would preferably incorporate a peripheral handling flange, with the rectangular carrier 74, other than for the rectangular configuration of the lower and upper collars thereof, incorporating all of the features of the carrier 10, and similarly interlocking and interengaging with the received containers.

The foregoing is considered illustrative of the principals of the invention and, in conjunction with the following claims, is considered to encompass additional embodiments and modifications as may occur to those skilled in the art.

I claim:

1. A carrier for containers, said carrier comprising a lower collar, an upper collar, and flexible, elongated strap means therebetween having closely spaced ratchet teeth formed along the length thereof, said strap means having upper and lower ends, strap retaining means on said lower collar for receiving and retaining the lower end of said strap means, strap retaining means on said upper collar having means for engaging and locking to the ratchet teeth of said strap means, and lock means on said lower collar for releasably locking said lower collar to a container receivable therein.

2. The carrier of claim 1 wherein said upper collar includes a generally vertical peripheral wall with an upper wall projecting inwardly therefrom peripherally thereabout, said walls defining an inner surface engagable with and about the upper portion of a container received therein.

3. The carrier of claim 2 wherein said lower collar includes inner and outer peripheral sides and upper and lower edges, the inner side of said lower collar including an inwardly directed lip peripherally thereabout adjacent the lower edge thereof for supportive engagement with a received container.

4. The carrier of claim 3 wherein said lock means comprises lug means projecting inwardly from said inner side of the lower collar above the inwardly directed lip, and recess means defined immediately below said lug means and between said lug means and said lip for a snap-locking of a peripheral portion of a received container therein.

5. The carrier of claim 4 wherein said lug means comprises a plurality of individual lugs spaced peripherally about said lower collar.

6. The carrier of claim 5 including a tab integral with said lower collar and projecting outward from the outer side thereof for selective manual engagement for release of the lower collar from a received container.

7. The carrier of claim 6 wherein the strap retaining means on the lower collar comprises diametrically opposed outwardly projecting ears, each defining a vertical aperture therethrough, said strap means comprising a pair of vertically elongated straps, each upwardly receivable through one of the ear apertures, each strap including an enlarged head on the lower end thereof, said head being larger than the associated ear aperture and incapable of passage upward therethrough.

8. A carrier for containers, said carrier comprising:

a lower collar including inner and outer peripheral sides and upper and lower edges, the inner side of said lower collar including an inwardly directed lip peripherally thereabout adjacent the lower edge thereof for supportive engagement with a received container;

an upper collar including a generally vertical peripheral wall with an upper wall projecting inwardly therefrom, peripherally thereabout, said walls defining an inner surface engageable with and about the upper portion of a container received therein;

a pair of vertically elongated straps between said lower collar and said upper collar, each strap having upper and lower ends, and an enlarged head on the lower end;

strap retaining means on said lower collar for receiving and retaining the lower end of the straps comprising diametrically opposed outwardly projecting ears, each defining a vertical aperture therethrough, said straps being each upwardly receivable through one of the ear apertures, said head being larger than the associated ear aperture and incapable of passage upward therethrough;

strap retaining means on said upper collar for engaging and locking to said strap means;

lock means on said lower collar for releasably locking said lower collar to a container receivable therein comprising a plurality of individual lugs spaced peripherally about said lower collar and projecting inwardly from said inner side of the lower collar above the inwardly directed lip, and recess means defined immediately below said lug and between said lug means and said lip for a snap-locking of a peripheral portion of a received container therein;

a tab integral with said lower collar and projecting outward from the outer side thereof for selective manual engagement for release of the lower collar from a received container.

9. The carrier of claim 8 wherein each of said straps includes ratchet teeth defined along the length thereof, the strap retaining means on the upper collar comprising means defining a vertical passage for each strap, and a pawl on the upper collar directed inwardly relative to each passage for engagement with selected ratchet teeth of the strap received therethrough.

10. The carrier of claim 9 including a handle spanning the upper collar between said strap accommodating passages, said handle including an outwardly directed recess along the length thereof for selective reception of the upper portions of the straps therein.

11. The carrier of claim 10 wherein the handle recess is defined by laterally spaced generally vertical flanges, said flanges extending transversely across the upper collar to each side of each of the strap retaining means on the upper collar.

12. The carrier of claim 8 including integral projections on each of said straps in spaced relation above the enlarged head for engagement with the upper surface of the corresponding ear for cooperation with the enlarged head in releasably fixing the strap end to the ear.

13. A carrier for containers, said carrier comprising:

a lower collar;

an upper collar having a generally vertical peripheral wall with an upper wall projecting inwardly therefrom peripherally thereabout said walls defining an inner surface engageable with and about the upper portion of a container received therein;

strap means between said lower collar and said upper collar comprising a pair of vertically elongated straps each having an upper end and a lower end with an enlarged head on said lower end;

strap retaining means on said lower collar for receiving and retaining the lower end of each of said straps comprising diametrically opposed outwardly projecting ears, each of said ears defining a vertical aperture therethrough, each of said straps being upwardly receivable through one of the ear apertures with said head being larger than the associated ear aperture and incapable of passage upward therethrough; and strap retaining means on said upper collar for engaging and locking to said strap means.

14. The carrier of claim 13 wherein each of said straps includes ratchet teeth defined along the length thereof, the strap retaining means on the upper collar comprising means defining a vertical passage for each strap, and a pawl on the upper collar directed inwardly relative to each passage for engagement with selected ratchet teeth of the strap received therethrough.

15. The carrier of claim 14 including a handle spanning the upper collar between said strap accommodating passages, said handle including an outwardly directed recess along the length thereof for selective reception of the upper portions of the straps therein.

* * * * *